United States Patent
Schmid et al.

(10) Patent No.: US 7,062,975 B2
(45) Date of Patent: Jun. 20, 2006

(54) SENSOR WITH DATA STORAGE MEDIUM

(75) Inventors: Edwin Schmid, Dachsen (CH); Peter Wolfer, Kleinandelfingen (CH)

(73) Assignee: Kistler Holding AG, Winterthur (CH)

( * ) Notice: Subject to any disclaimer, the term of this patent is extended or adjusted under 35 U.S.C. 154(b) by 514 days.

(21) Appl. No.: 10/266,753

(22) Filed: Oct. 9, 2002

(65) Prior Publication Data
US 2003/0073341 A1    Apr. 17, 2003

(30) Foreign Application Priority Data
Oct. 12, 2001    (EP)    ................... 01810997

(51) Int. Cl.
G01L 19/14    (2006.01)
H01R 9/05    (2006.01)

(52) U.S. Cl. .................. 73/756; 73/753; 73/866.5; 439/578; 439/579; 439/582

(58) Field of Classification Search ................ 73/1.16, 73/1.57, 1.59, 23.23–23.34, 25.01–25.05, 73/31.04, 31.05, 866.1, 866.5, 753, 756; 439/578–585, 98, 101, 108, 218, 283
See application file for complete search history.

(56) References Cited

U.S. PATENT DOCUMENTS

| | | | | |
|---|---|---|---|---|
| 3,821,900 A * | 7/1974 | Preikschat | ................ | 73/304 C |
| 4,453,835 A * | 6/1984 | Clawson et al. | ............ | 374/185 |
| 4,708,666 A * | 11/1987 | Fisher, Jr. | .................. | 439/580 |
| 4,765,193 A * | 8/1988 | Holden et al. | ............. | 73/865.9 |
| 4,788,431 A * | 11/1988 | Eckes et al. | ................ | 250/397 |
| 5,489,888 A | 2/1996 | Jagiella et al. | ............. | 340/537 |
| 5,500,504 A | 3/1996 | Jagiella et al. | ......... | 219/121.67 |
| 5,511,415 A * | 4/1996 | Nair et al. | ................ | 73/204.11 |
| 5,792,951 A | 8/1998 | Ismail et al. | ............. | 73/204.11 |
| 5,929,333 A | 7/1999 | Nair | ........................ | 73/204.11 |
| 5,969,270 A * | 10/1999 | Doemes et al. | ........ | 73/862.626 |
| 6,250,130 B1 * | 6/2001 | Howard et al. | ............. | 73/1.36 |

FOREIGN PATENT DOCUMENTS

| | | |
|---|---|---|
| DE | 37 33 747 A1 | 4/1989 |
| DE | 40 35 403 A1 | 5/1992 |
| GB | 2 284 059 A | 5/1995 |

* cited by examiner

*Primary Examiner*—Hezron Williams
*Assistant Examiner*—David A. Rogers
(74) *Attorney, Agent, or Firm*—Barnes & Thornburg LLP

(57) ABSTRACT

A sensor assembly including a sensor and a data storage medium, on which the specific data of the sensor, such as type, measurement range, calibration date, serial number, manufacturer, etc. are stored. The data may be directly transmitted from the data storage medium to the evaluation device for the adjustment of the evaluation device. Measurement signals from the sensor and data signals from the data storage medium are transmitted via a plug to the evaluation device. The data storage medium is arranged outside the sensor in the connection to the plug, or in the plug enclosure, and is, thus, firmly connected to the sensor. Thus, the sensor, e.g., a piezosensor for the determination of pressures, accelerations or forces, is suitable for the employment in a region with increased temperatures.

11 Claims, 2 Drawing Sheets

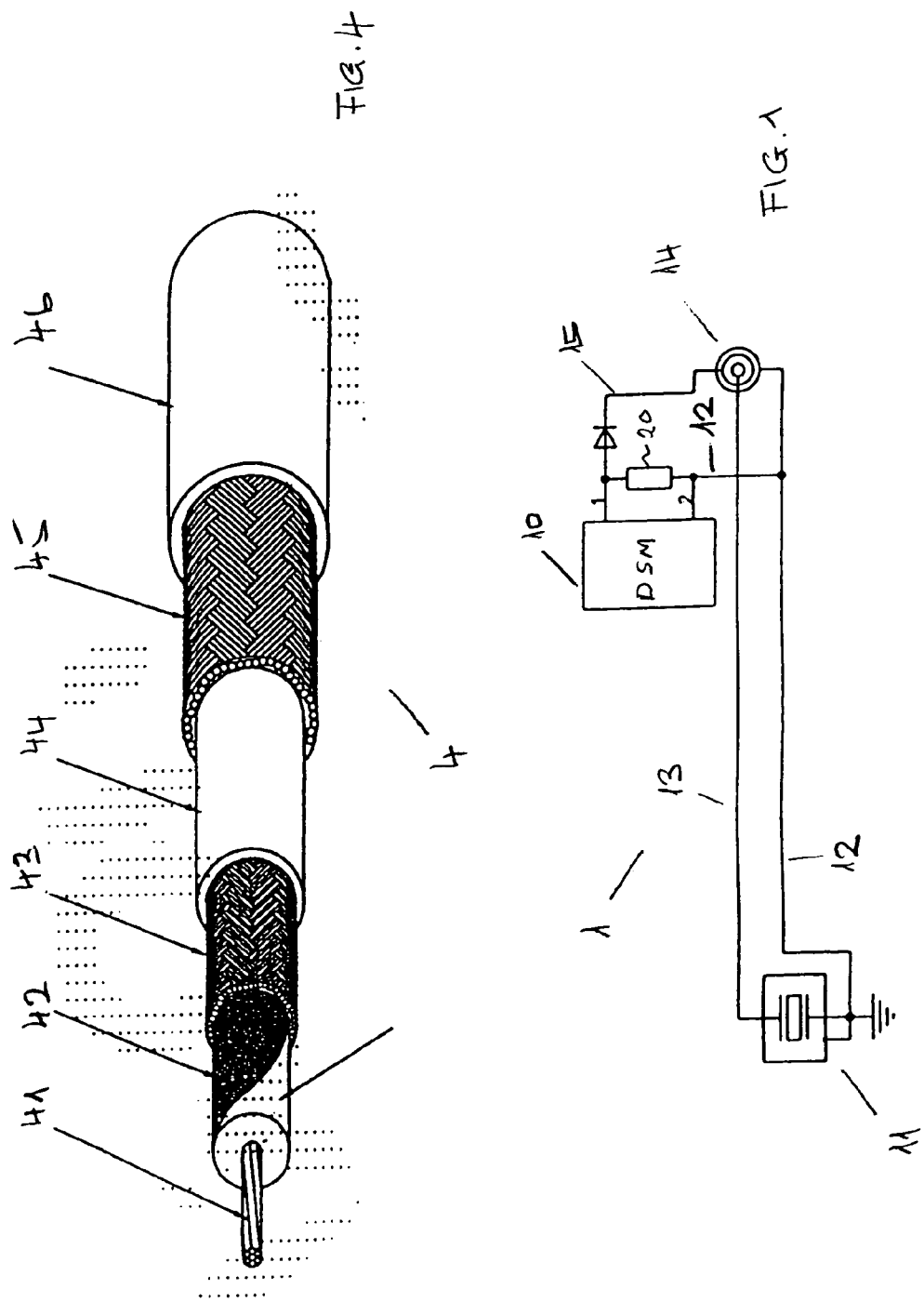

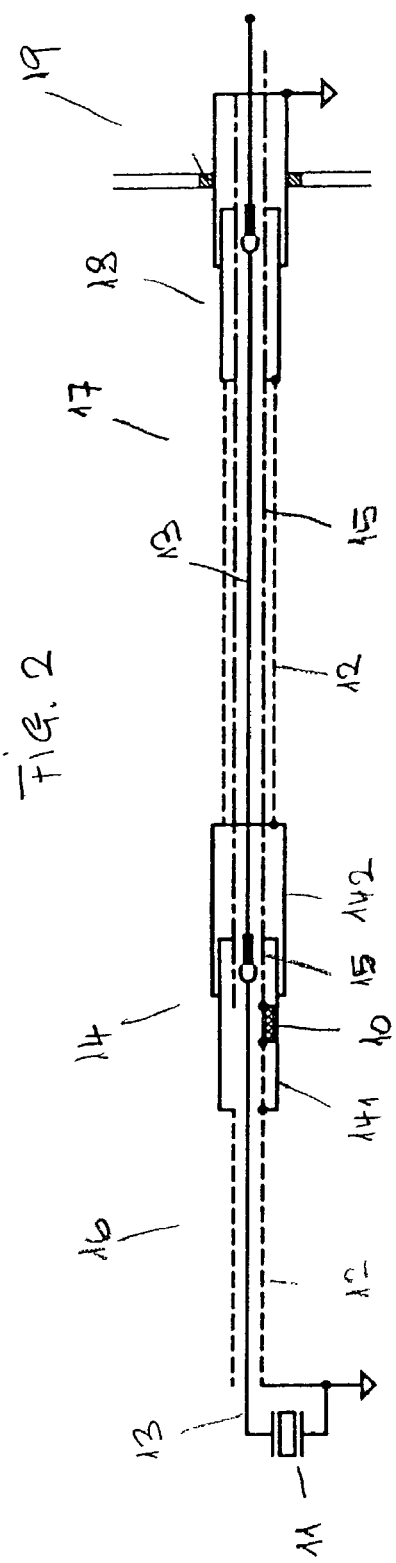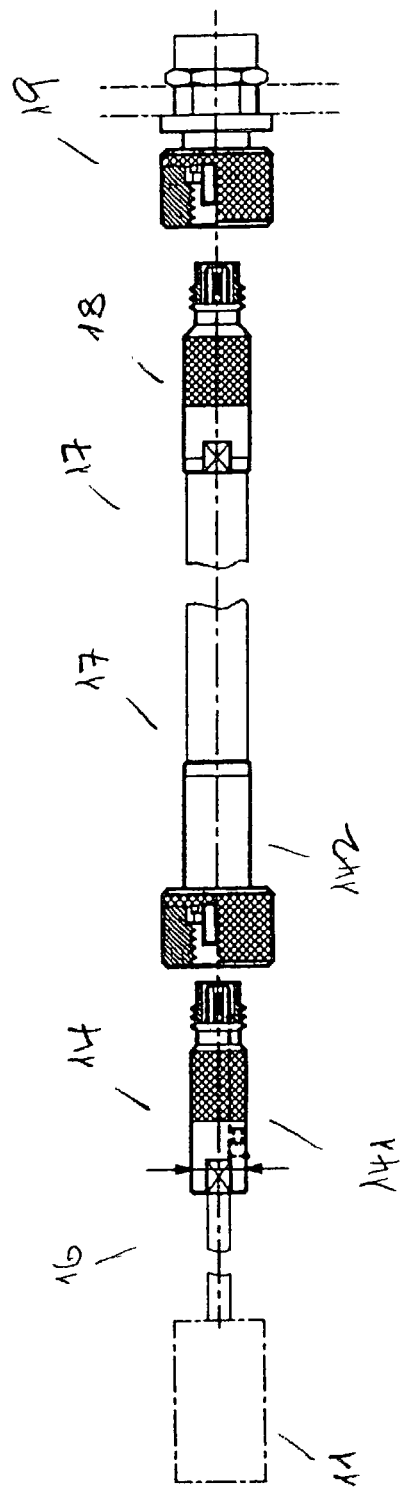

SENSOR WITH DATA STORAGE MEDIUM

BACKGROUND AND SUMMARY OF THE INVENTION

The present invention relates generally to a sensor and, more specifically, to a sensor with data storage medium.

Sensors for measurement of pressure, force, acceleration and temperature are frequently applied and employed in the measuring technique. These sensors often have their own identity or characteristics, i.e., the sensors of the same type and of the same construction have different sensitivities or other properties. As long as only a single type of sensor is used in a particular measuring set-up, the individual adjustment of the evaluation device to the individual sensor may be handled well and reliably.

It is more difficult to prevent confusion if a plurality of sensors of the same construction size are used or if, in the mounted state, just the connector plug thereof is accessible. This is, for example, the case with combustion engines, gas or steam turbines, die casting machines, die casting tools, extrusion machines, punching machines, crash walls, etc. or otherwise in the measurement of forces, pressures and/or accelerations. Thus, it is important not to confuse the sensor's own individual data. The data specifications, in whatever form, should be assigned definitely and unconfusably.

It is known to assign to a sensor, e.g., piezoelectric sensors, such as acceleration sensors, pressure sensors or force sensors, the data specifications of the sensor in an electronic storage medium. It is possible to store data, such as sensitivity, date of calibration, sensor type, serial number, person who carried out the calibration, etc. on this electronic storage medium, e.g., an EPROM. Moreover, it is also possible to directly store on the storage medium the adjustment parameters for the evaluation device, to which the measurement data of the sensor are transmitted for evaluation. By means of these data from the storage medium, the sensors adjusts the evaluation device directly by itself.

In order to achieve the required safety in the evaluation of the measurement data, it is also necessary, with these electronic storage media, to clearly and mutually assign measurement sensor and data storage medium. This may be achieved, for example, by integrating or incorporating the data storage medium into the enclosure of the sensor.

By using sensors, such as piezoelectric pressure sensors in an environment where high temperatures are encountered, sensors with data storage media incorporated into the sensor enclosure are no longer suitable. Electronic data memories, such as EPROMS, do not operate at temperatures over 150° C. to 200° C. and are destroyed.

Therefore, the data storage medium has to be mounted away from the actual sensor outside of the high temperature area and inseparably connected to the sensor, if possible.

In piezoelectric sensors, such as pressure sensors, the transmission of the measurement signals is in a high-resistance manner. Generally, the data of the data storage media are transmitted in a low-resistance manner. Thus, the transmission of the measurement data and the data of the storage medium advantageously have to be carried out via separate conductors. This leads to connection cables, which do not enable any miniaturization at a reasonable cost. Additional difficulties arise, if in addition, the data medium has to be arranged in an inseparable manner outside of the sensor enclosure.

In this respect, it is an object of the present invention to provide an improved sensor. The construction principle enables transmission of measurement signals and data signals from the data storage medium with a connection to the evaluation device enabling a considerable miniaturization.

According to the present invention, the sensor assembly positions the data storage medium in the connection of the sensor and the data storage medium to an evaluation device and spaced from the sensor. The largest diameter of the plug and the cable is at most equal to or smaller than a diameter of a sensor enclosure in a mounting area of the sensor. The connection includes one or more of coaxial and triaxial cables.

By the special connection of the measurement signals formed by the sensor and the data signals to the pins and ears in the plug of the sensor, it is possible to design the connection line and the plug of the sensor in a miniaturized construction. If it is impossible to integrate the data medium into the sensor, e.g., because the sensor is employed in a high temperature area, the data medium may be integrated into the plug area, without requiring to choose a plug with larger dimensions. On the other hand, this enables the use of the typical mounting tools for mounting, such as socket spanners, by guiding plug and cable of the sensor through the socket spanner in the course of the installation.

These and other aspects of the present invention will become apparent from the following detailed description of the invention, when considered in conjunction with accompanying drawings.

BRIEF DESCRIPTION OF THE DRAWINGS

FIG. 1 is a schematic showing a sensor having a data storage medium according to the principles of the present invention.

FIG. 2 schematically shows the sensor having data storage medium and connection to a coaxial cable from the sensor to a plug and to a triaxial cable from the plug to an evaluation device.

FIG. 3 shows the arrangement of sensor, coaxial cable, plug and triaxial cable to the evaluation device of FIG. 2 in a schematic outside view.

FIG. 4 is a cut-away perspective of the construction of the triaxial cable.

DETAILED DESCRIPTION OF THE PREFERRED EMBODIMENTS

As shown in FIG. 1, a sensor 11 of circuit 1 is connected by the ground line 12 and the measurement signal line 13 to plug 14. The data specifications for sensor 11 are stored on a data storage medium 10, e.g., an EPROM chip. Data storage medium 10 shares the ground line 12 with sensor 11. Data line 15 from data storage medium 10 also leads to plug 14 by a diode, for example. A resistor 20 is connected across the terminals of data storage medium 10. The lines 12 and 13 may be the conductor and a shield of a coaxial cable.

On the other hand, in the arrangement of FIGS. 2 and 3, the measurement signal line 13 and the ground line 12 are connected, e.g., through a shielded coaxial cable 16, to the pins and contacts of plug 14. The data storage medium 10 is arranged in portion 141 of plug 14. Portion 141 of the plug enclosure is conductive and connected in a conducting manner with ground line 12. From the first plug 14 with triaxial output, the measurement signals and the data signals are connected, e.g., with a triaxial cable 17, to a further plug 18, which is connected to the input of the evaluation device 19 in the example shown.

The largest diameter of the plug 14 and cable 16 is at most equal to or smaller than the diameter of the enclosure of sensor 11 in the sensor's mounting area. The diameter of the sensor enclosure in its mounting area is at most 10 mm and, generally, at most 5 or 6 mm.

Finally, FIG. 4 shows the construction of a triaxial cable 4 with conductor 41, a first insulation layer 42, a first shield 43, a second insulation layer 44, a second shield 45 and an outer third insulation layer 46.

A part of the sensor is the data storage medium, on which the data specifications of the sensor, such as type, measurement range, calibration date, serial number, manufacturer, etc. are stored. The data may be transmitted directly for adjustment of the evaluation device from the data storage medium to the evaluation device. Measurement signals from the sensor and data signals from the data storage medium are transmitted to the evaluation device through a plug. The data storage medium is arranged outside of the sensor and in the connection to the plug, e.g., in the plug enclosure, and, thus, firmly connected to the sensor. Thus, the sensor, e.g., a piezosensor to determine pressures, accelerations or forces, is suitable for use in an environment with increased temperatures.

Although the present invention has been described and illustrated in detail, it is to be clearly understood that this is done by way of illustration and example only and is not to be taken by way of limitation. The spirit and scope of the present invention are to be limited only by the terms of the appended claims.

We claim:

1. A sensor assembly comprising:
   a sensor providing measurement signals;
   a data storage medium providing data signals;
   a connection having a plug connecting the sensor and data storage medium to an evaluation device, wherein the connection includes a coaxial cable between the sensor and the plug and a triaxial cable between the plug and the evaluation device;
   the data storage medium being connected to and spaced from the sensor;
   a largest diameter of the plug and the connection being at most equal to or smaller than a diameter of a sensor enclosure in a mounting area of the sensor; and
   wherein the sensor, coaxial cable, plug, data storage medium and triaxial cable share a common ground line, thereby permitting a miniaturization of the plug.

2. The sensor according to claim 1, wherein the connection includes at least one of a twin-core cable and a triple-core cable.

3. The sensor according to claim 2, wherein the cable has at least one shield.

4. The sensor according to claim 1, wherein the connection includes a triaxial cable having a conductor, two shields and insulations between the conductor and the shields.

5. The sensor according to claim 1, wherein the data storage medium is in the plug and inseparably connected to the sensor; and wherein the measurement signals and the data signals are transmitted via the plug.

6. The sensor according to claim 1, wherein the diameter of the sensor enclosure in its mounting area is at most 10 mm.

7. The sensor according to claim 1, wherein the data storage medium has specific data of the sensor, including one or more of manufacturer, measurement range and calibration date, stored in a recallable manner.

8. The sensor of claim 1, wherein the diameter of the sensor enclosure in its mounting area is at most 6 mm.

9. The sensor of claim 1, wherein the sensor is one of a pressure sensor, force sensor, acceleration sensor and a temperature sensor.

10. A combustion engine with a sensor according to claim 1 for the determination of cylinder pressures.

11. A combustion engine, gas turbine, steam turbine, die casting machine, die casting tool, extrusion machine, punching machine or crash wall with a sensor for measuring forces, pressures or accelerations according to claim 1.

* * * * *